United States Patent [19]

Miller

[11] 3,990,039
[45] Nov. 2, 1976

[54] TUNED GROUND MOTION DETECTOR UTILIZING PRINCIPLES OF MECHANICAL RESONANCE

[76] Inventor: Larry D. Miller, 145 N. El Camino Road, San Mateo, Calif. 94402

[22] Filed: Apr. 7, 1975

[21] Appl. No.: 565,925

[52] U.S. Cl. .................................. 340/17 R; 73/71; 73/71.2; 181/122
[51] Int. Cl.² .......................................... G01V 1/16
[58] Field of Search ............... 73/71, 71.2; 181/122; 340/17 R

[56] References Cited
UNITED STATES PATENTS

| | | | |
|---|---|---|---|
| 2,659,065 | 11/1953 | Cordell | 340/17 |
| 2,780,301 | 2/1957 | Jakosky | 181/122 |
| 3,286,229 | 11/1966 | Millis | 73/71 X |
| 3,297,982 | 1/1967 | Beach | 73/71.2 X |
| 3,359,538 | 12/1967 | Raphael | 73/71.2 X |
| 3,685,011 | 8/1972 | Lehner | 73/71.2 X |

*Primary Examiner*—Leland A. Sebastian
*Attorney, Agent, or Firm*—Townsend and Townsend

[57] ABSTRACT

A mechanically resonant ground motion sensor having a frequency response which is "tuned" to discriminate between applied vibrational forces which are destructive and those which are not. The basic operating principle of the sensor is that of an oscillating mass whose dynamic response to applied forces takes the form of viscously damped harmonic motion. The disclosed embodiments include a horizontal ground motion detector based on the movement of a pendulum in a viscous fluid and a vertical ground motion detector utilizing a vertically sprung dashpot cylinder moving through a viscous fluid. The detector is tuned to trigger a tripping mechanism in response to accelerations above a threshold value and within the critical range of destructive frequencies. Tuning is accomplished through appropriate selection of the various design parameters including the active surface area upon which the viscous force acts, the fluid gap between moving and stationary surfaces, the weight of the moving element and the fluid viscosity. The sensor may be used to disable or deactivate systems such as elevators or gas lines which may become life endangering during a destructive earthquake.

10 Claims, 4 Drawing Figures

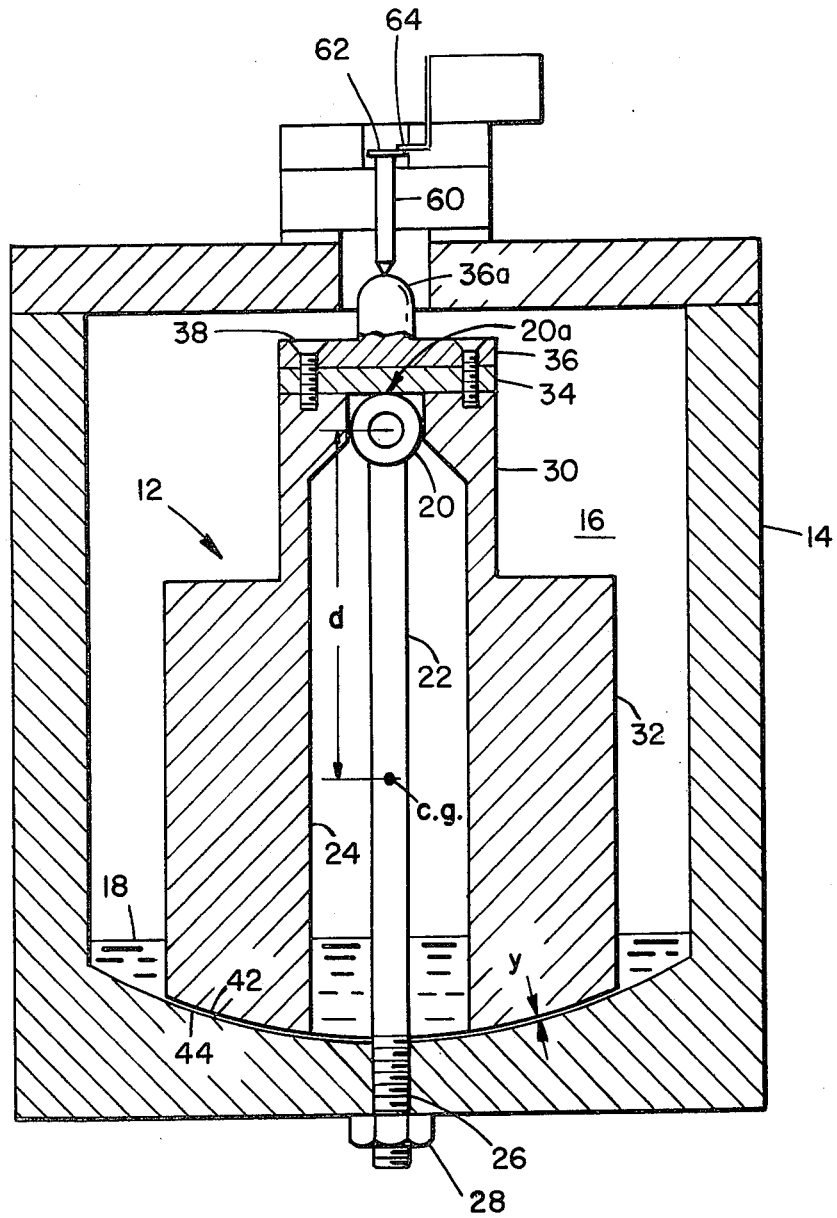
FIG_1

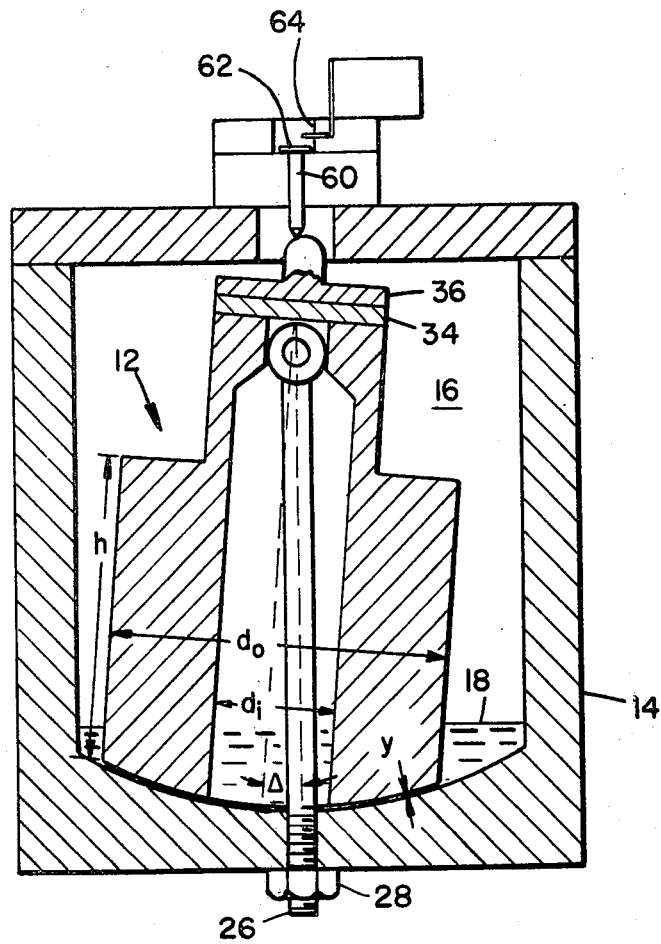
FIG_2
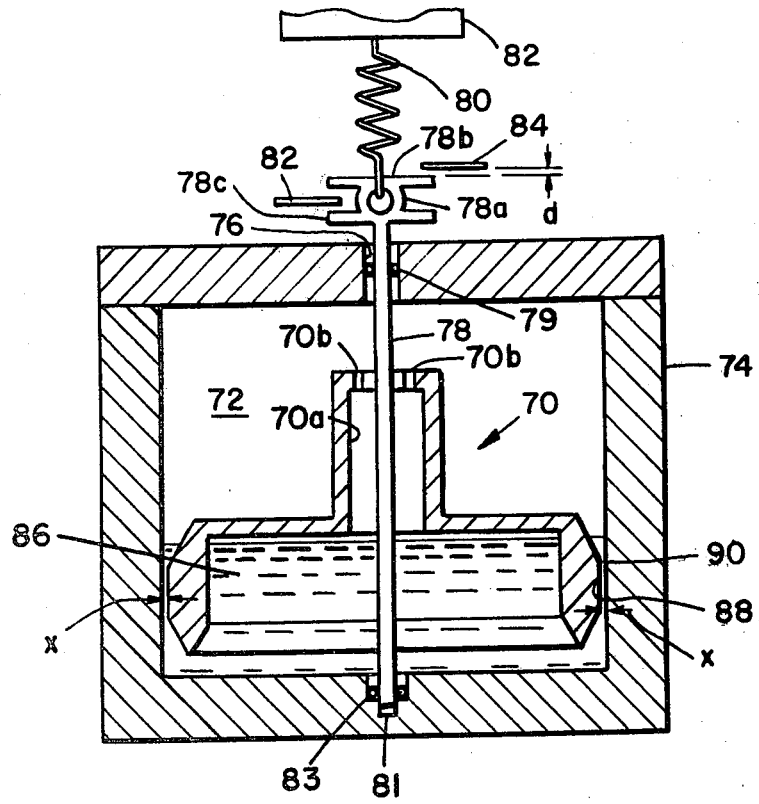
FIG_3

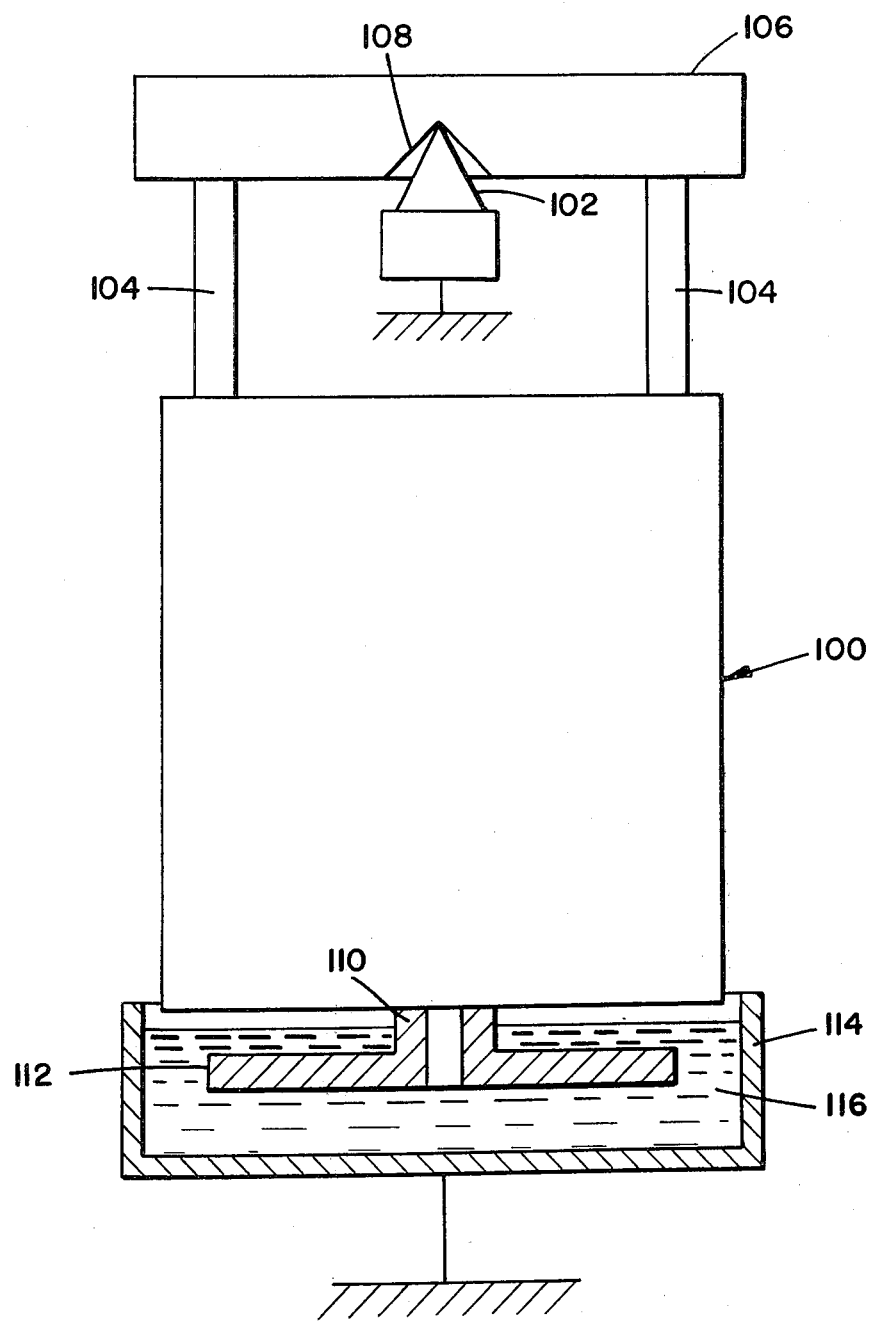
FIG_4

3,990,039

TUNED GROUND MOTION DETECTOR UTILIZING PRINCIPLES OF MECHANICAL RESONANCE

OUTLINE OF THE DISCLOSURE

Introduction
I. Frequency Spectra of Seismic Ground Movements — "The Input Signal"
II. Filtering and Amplification of Ground Motion by Structures — "The Antenna"
III. Resonant Ground Motion Sensor — "The Tuned Receiver"
   A. Description of the Drawings
   B. Horizontal Ground Motion Detector
   C. Vertical Ground Motion Detector

INTRODUCTION

The present invention relates to ground motion detectors and is more particularly directed to a seismic vibration sensor which is "tuned" to discriminate between those earth tremors which are destructive and those which are not.

Various types of control mechanisms sensitive to ground motions have been proposed to deactivate systems which may become life endangering when subjected to a destructive earth tremor. For example, many types of vibration sensitive mechanical arrangements employing weights, springs, levers, cams and the like have been used to disconnect power to elevator systems or shut off control valves in pipelines containing combustible gases or liquids whenever a strong ground movement is detected. In general, these rather primitive mechanical devices are sensitive only to the magnitude of the applied vibration energy and are not "tuned". That is, they do not have a sensitivity response which discriminates between vibrations within the critical range of frequencies which are destructive and those of higher or lower frequencies which are not damage producing.

The significance of the relationship between the vibrational frequency of an earth movement and the severity of damage which is likely to occur results from the fact that application of rather small amplitude vibrations to a resonant structure can cause large amounts of damage to the structure if the natural resonance frequencies of the structure are excited. It is thus desirable to have a motion detector which is very sensitive to the vibrations within the critical range of frequencies which can cause damage; i.e., selectively sensitive to the rather narrow band of frequencies near the natural resonant frequencies of the structure. Very sophisticated vibration responsive devices such as accelerometers are available; however, most accelerometers are designed to have a uniform wide band frequency response and are sensitive to vibrations on one axis only so that omnidirectional sensing requires two units placed at right angles to each other with their outputs summed in root-sum-square (RSS) fashion. Due to the relatively narrow frequency range of actual seismic phenomena plus the additional filtering provided by the structure in which the sensor is located, a much simpler approach can be made to work very well which involves the use of a mechanically resonant sensor system. Two embodiments of such a system, one comprising a horizontal motion detector and the other a vertical motion detector will be described below.

In order to better understand the design principles underlying construction of the embodiments disclosed herein it is helpful to discuss at the outset the nature and characteristics of the seismic energy generated by movements of large geological formations and transmitted to structures on the surface of the earth. Another important design consideration relates to the manner in which a given structure such as a building responds to this applied seismic energy. As will be demonstrated, the earth between the site of origin of a seismic disturbance and the surface acts as a bandpass filter so that only vibrational energy within a particular range of frequencies is presented to structures at the surface. Further, any given structure acts both as a filter and a resonator to change the amplitude and frequency spectrum of the motions at the sensor. This is a very important point which must be taken into account for successful operation of any earthquake sensing system.

In describing the nature of the seismic vibrations to which a ground motion sensor is subjected it is helpful to make use of an analogy between the tuned mechanically resonant detector of the present invention and a tuned electrically resonant device such as a radio receiver.

The seismic energy which originates from the movement of geological formations beneath the earth and is transmitted to the surface where it is manifested in the form of an earthquake can be likened to the radiation of electromagnetic waves from a radio transmitter to a receiver some distance away. The earth acts as a bandpass filter which blocks or dissipates high frequency and low frequency vibrations so that a structure on the earth's surface receives only vibrational energy within a relatively narrow range of frequencies. Thus, the energy which reaches the earth's surface is analogous to a broadcast radio signal with a particular range of frequencies or bandwidth.

Additionally, the resonant response characteristic of the structures in which seismic detectors are placed will have an additional modifying effect on the motion presented to the sensor. Thus, the building in which the sensor is located can be analogized to a receiving antenna which is used to collect and prefilter broadcast signals. Such antennas have "gain" and a limited range of frequencies to which they respond. The same holds true for the ground motion sensor as well, and the properties of structures are used to advantage to further enhance the selectivity of the sensor to include only the desired responses.

Finally, the seismic detector itself is analogous to a radio receiver in the electrical situation wherein by varying its basic construction a range of results in terms of size, response characteristics, fidelity of reproduction, etc., are possible.

I. FREQUENCY SPECTRA OF SEISMIC GROUND MOVEMENTS — "THE INPUT SIGNAL"

Earthquakes are characterized by "shaking", i.e. cyclic, motions or low-frequency vibrations. Even though the slippages which cause these motions are caused by sudden release of stored energy (shocks) due to the compression, tension, or shear strengths of the local geological formations being exceeded, certain vibration rates are propagated to adjacent areas more readily than others. Much has been written and experimentally verified in recent years about "plate tectonics", a theory which explains much that has been observed about geological activity. The thrust of the theory is that the outer surface of the earth is comprised of more or less rigid masses of material which drift with respect to each other. Great amounts of pressure build up at the boundaries between adjacent "plates". Initially, the plates cannot move with respect to each other due to a number of factors, including the irregular shapes of the plates. As time passes, the plates are pressed harder and harder (possibly due to forces caused by convection currents of the molten material underlying the plates or for a number of other reasons) into contact with each other. Finally, the pressure between the adjacent plates becomes so great that structural failure occurs at or near the plate boundaries and sudden slippage between the plates also occurs. While there are also other mechanisms operating as well, this sudden slippage appears to be the prime cause of earthquakes. The boundaries of the plates are well known in the United States and in many other places in he world; these boundary areas are most likely to experience earthquake activity, as can be seen on maps depicting the recorded incidences of geological activity.

Although an abrupt slip between two adjacent rock formations may be considered the source of energy for an earthquake (i.e., the sudden conversion of potential or stored energy into kinetic energy), an earthquake is hardly ever experienced as a single jolt. This is partly due to the fact that the rupture generally occurs deep underground (6 to 30 miles down); thus, even for a slip directly beneath the observer, there is considerable earth material between the actual slip point and the observer. Also, it is doubtful that the slip occurs in an instantaneous manner, due to the huge amounts of moving material involved.

Propagation of the slip motion through the earth's surface structure is dependent upon the speed of sound in the earth (i.e., the compressibility of the material with respect to longitudinal and lateral waves), and due to the nonhomogeneity of geological formations, many reflections and refractions of the waves occur, causing standing waves and other phenomena. Thus, most earthquake activity is experienced as periodic shaking of the ground caused by dynamic meetings of direct and reflected waves, similar to the "waves on a pond" analogy.

Since the actual slip is generally remote from the surface, and since the earth's crust generally exhibits reasonably similar gross characteristics except at the surface, it might be expected that the interaction of direct and reflected traveling waves in the earth might produce surface motions which are similar to those observed when transient signals are applied to distributed and possibly resonant electrical networks. For example, an abrupt electrical current pulse or step function such as is produced by closing a switch can be applied to a series of reactive circuit elements in a network. With the proper selection of elements, practically any output from a slow, powerful wave to microwave or RF or even pulses can be obtained. This is due to the fact that the disturbance input contains essentially all frequencies possible, and the observed output is primarily a function of the filtering and reinforcing properties of the circuit to which the disturbance is applied. If the analogy or model of an earthquake is similar (i.e., a transient or an impulse of step nature being passed through a filtering medium which is at least partly reactive and underdamped), it should be possible to expect that the motions reaching the surface of the earth would, on the whole, show definite characteristics. In particular, it would be expected that the motions would have much of their energy at certain vibration rates, and little or no energy at other vibration rates. The following discussion demonstrates the similarity of this analogy.

To begin with, it is possible to say that the earth does not propagate high frequency mechanical waves to any degree; frequencies above the lower audible range must be rapidly dissipated, or the earth would exhibit an extremely high audio background noise level. In fact, very little audio energy is readily passed through the earth; most of the "rumbling" associated with earthquakes is transmitted through the air. Thus, it is reasonable to set 20 vibrations per second as an upper limit for earthquake motions. (20 vibrations/sec. is the general lower limit of human hearing.)

It is true that the earth propagates and responds to very low rates of motion, equivalent to DC electrical currents in the preceding analogy. However, even though very slow creepage can cause structural damage similar to earthquake-caused damage, this is not usually considered in terms of earthquakes, since it is not caused by sudden kinetic energy release into the earth's crust (in fact, slow creepage appears to be a necessary precursor to an earthquake in that this is how pressure builds up.) It is observable that the earth's surface also responds to gravitational forces from the moon; again, however, this is not caused by the earthquake mechanism. It has been found by measurement that earthquake motions generally do not contain vibrations with periods longer than 10 to 15 seconds, corresponding to a frequency as low as 0.067 vibration per second.

Statistical analysis of a large amount of seismic recorded data confirms these suppositions and demonstrates the following:

a. There is a finite range of vibrational frequencies associated with earthquake vibrations;

b. The frequency spectra of these vibrations appear to follow a normal (Gaussian) probability density;

c. The mean frequency of such energy is about 2 vibrations per second during the early portion of an earthquake, with a range of expected values of from about 1.2 to 4.7 vibrations per second;

d. The probability of (c) being true is more than 99%;

e. The very first vibrations in an earthquake are higher in frequency than later vibrations, and there appears to be a negative or reverse correlation between these frequencies and the eventual earthquake magnitude. (The conclusion from this is that the sensor should be designed to have peak response at the lower end of the initial spectrum range, since lower initial frequencies are associated with larger magnitude vibrations.)

The above conclusions are used in the design of the resonant sensors to be described.

II. FILTERING AND AMPLIFICATION OF GROUND MOTION BY STRUCTURES — "THE ANTENNA"

The frequencies and amplitudes of ground motions discussed in the previous section are only important when related to characteristics of buildings and other structures subjected to the ground motions.

All structures have mass and compliance or elasticity. Theoretically, then, all structures have natural resonant frequencies for which motions at the base of the structure will cause larger or "amplified" motions in various portions of the structure. The degree of amplification is a function of the structure's form and damping characteristics. In any case, damage to the structure occurs when the stress level at any point exceeds the elastic limit of the material at that point in the structure. These stresses are caused by the fact that the structure can not, as a whole, follow or absorb the ground motions occurring at or near the natural resonant frequency, and relative motions between various parts of the structure occur.

Structures vary widely in terms of compliance and damping. For example, masonry structures generally exhibit rather large internal damping and very low values of compliance and elastic limit. Thus, although the structure exhibits very little resonance amplification of ground motions, its rigidity and lack of tensile strength causes the structure to be shattered when very small relative motions are induced in the structure near its natural resonant frequencies (caused by the inertia of the structure not permitting the whole structure to follow the ground motion). On the other hand, steel structures show much greater elasticity but much lower internal damping. Thus, large resonance amplification of ground motions at specific frequencies occurs. This can cause the elastic limits of structural members to be exceeded with corresponding damage. (A good example of this is in large parabolic tracking antennas. The servo drive systems have to be configured so that the natural structural resonance frequencies of the antennas are not excited. If excitation occurs at these frequencies, the motions resulting from resonant amplification are so large that various members, welds, rivets, etc are literally torn to pieces or fail within a short time due to stress fatigue. This phenomenon has also been observed in bridges.) It is undoubtedly true to say that no building of any size is completely "earthquake proof", although modern building design can greatly reduce susceptibility to ground motions.

Although buildings vary greatly in their responses to ground motions, it is possible to make some generalizations which allow assessment of the type of motion which would be presented to a ground motion detector, and also indicate the most advantageously mounting location for the sensor. (Note that it is possible that the sensor may have to be located remotely from the equipment it services. This greatly influences the selection of the sensor configuration and immediately underscores the advantages of using an electrical output from a small, compact sensor package.)

The following statements may be made as generalizations which are independent of the precise structure, but are due only to the fact that any structure has mass and compliance:

a. At very low vibration rates or frequencies, the structure will follow the ground motion as a rigid whole;

b. Over some intermediate range of frequencies, there will be relative motion between the ground and the structure or between various parts of the structure. If the system has low internal damping, the resulting relative motions will be much larger at certain frequencies than at others.

c. At higher frequencies, the inertia of the structure will cause it to be largely unable to follow the ground motions, and there will be relative motion between the ground and portions of the structure. Due to the internal damping in the structure, the structure will absorb most of the energy of the ground motion and the acceleration away from the base of the structure will be equal to and out of phase with the ground motion. In practice, it is possible to rather easily design structures which can survive the conditions associated with statements (a) and (c) above. The range of frequencies associated with statement (b) are the ones which cause practically all earthquake damage.

Examining the above statement in terms of dynamic motions, it is apparent that at low frequencies the structure motion equals the ground motion (relative motion = 0)

at intermediate frequencies the structure motion differs from the ground motion (relative motion   0)

at high frequencies the structure motion is equal and opposite to the ground motion. Thus, to an observer of the structure at a place in the structure remote to the interface between the ground and structure, there will be no apparent relative motion. The acceleration of the base of the structure and ground will be absorbed. (relative motion = 0)

It can thus be seen that the structure behaves as a bandpass filter, transmitting relative motions over a certain range of frequencies and absorbing or cancelling motions both above and below this range of frequencies.

It has been found from analysis of structural responses to seismic activity that adequate protection can be obtained using a sensor which has its maximum response range over the range of 0.1 to nine vibrations/sec. This is fairly typical of structures, since a structure which has severe resonances below about 0.5 vibrations/sec would not generally meet other building safety codes, and a structure with severe resonances above nine vibrations/sec would be unduly rigid and presumably uneconomical to build. Typical steel structures show resonant amplification peaks in the 0.5 to three vibrations/sec range, so that in all probability a single set of sensor parameters could be made to suffice.

One additional point should be made in connection with structural resonances. Since the elastic properties of the structure are distributed throughout the structure, vibration nodes and antinodes can develop, especially in very tall structures. If the height of the structure is sufficient, Euler's column buckling formulas apply. It would thus be possible to mistakenly install the sensor in a position which showed little or no motion, even though severe motions and stresses were present elsewhere in the structure. This phenomenon is similar to that displayed by a string on a musical instrument. Under these circumstances, the function of the sensor would be defeated. It is thus very important to install the sensor at a point in the structure which will display high motion values. If this point is not known with any reasonable degree of certainty, then the only safe course of action would be to install multiple sensors. The small size and electrical output of the sensor described in the next section allows great flexibility of location, remote from the equipment which will utilize the sensor output signals.

to summarize, it is apparent that a. the ground motions presented to a sensing device in a structure vary with vibration frequency;

b. these motions are modified in both amplitude and frequency distribution by dynamic resonances in the structure; and c. by suitable placement of the sensor in the structure it is possible to use the amplification of the structural resonances to make the sensor most sensitive to the large (and therefore destructive) motions which appear when the resonances are excited or standing waves appear in the structure. Finally, it is apparent that the sensor should be responsive over a limited range of frequencies to allow discrimination against man-made vibrations.

III. RESONANT GROUND MOTION SENSOR — "THE TUNED RECEIVER"

A. Description of the Drawings

FIG. 1 is a side elevation cross-section view of an omnidirectional horizontal ground motion detector based on the movement of a viscously damped pendulum, with the pendulum illustrated in is neutral position;

FIG. 2 is a view similar to that of FIG. 1 showing the pendulum in a triggering position;

FIG. 3 is a side elevation cross-section view of a vertical ground motion detector based on the movement of a viscously damped vertically sprung dashpot cylinder; and FIG. 4 is a perspective view partially in cross-section of a horizontal ground motion detector mounted for automatic leveling.

B. Horizontal Ground Motion Detector

The detector illustrated in FIGS. 1 and 2 and described in this section is primarily sensitive to horizontal ground motions. Although it is known that some earthquakes consist largely of vertical movements, the intensity of shaking in the vertical direction is typically less than two-thirds that in the horizontal direction. Further, since structures must be designed to support their own weight plus load, they are generally much more resistant to damage from vertical motion. This is especially true in the case of tall buildings. Finally, this device is also sensitive to vertical movements of sufficient amplitude to cause possible damage. The next section describes a sensor (shown in FIG. 3) which is primarily responsive to vibrations in the vertical direction.

As discussed in Section I above, the vibrations associated with ground tremors or earthquakes contain the major portion of their energy within the specific frequency range of 0.1 to nine vibrations per second. Most man-made vibrations occur at higher frequencies, although some large unbalanced machinery such as air compressors, pile drivers or other reciprocating devices can also produce vibrations within this range. As a minimum, however, it can be said that any device which is intended to respond to earthquake motions does not require response above 9 cycles per second. Indeed, it is desirable to have the device insensitive to high frequencies since these are almost certain to be man-made. Responsiveness above nine cycles per second would merely cause false triggering of the sensor.

In Section II above, it was seen that structures tend to act as mechanical filters and resonators so that some vibration rates are enhanced while others are suppressed. It is thus possible to utilized a building or other structure as a sort of filter to aid in "tuning" a sensor to respond selectively to desired vibration rates. Thus the sensor may be located in favorable places in a structure to effect the bandpassing characteristics desired.

Before describing the specific construction of the horizontal ground motion detector it is useful to summarize the design requirements for such a device as discussed above.

a. It must be equally sensitive to vibrations in any direction in a horizontal plane since most earthquakes exhibit predominantly horizontal motion and structures are most strongly affected by lateral or horizontal forces from any direction;

b. It must selectively respond to a particular range of vibration rates or frequencies with great sensitivity while ignoring vibrations outside the range of interest;

c. It should be sensitive to the duration of shaking since most structures are damaged more by lower amplitude repeated vibrations than by a single higher amplitude shock (e.g., sonic "boon");

d. The output should be digital in form - i.e., no output response to vibrations below the desired threshold value and 100% response to vibrations above it.

It can be seen that an accelerometer system with an analog output does not directly meet any of the above requirements without further signal processing to remove the surplus of output data. It is the purpose of this invention to provide a mechanically resonant device with controlled characteristics activating a tripping circuit or escapement.

The simplest mechanical arrangement exhibiting resonant behavior in a gravitational field is a simple pendulum. Its vibration period is independent of the pendulum mass and is a function only of its length and the strength of the gravitational acceleration (which will be considered uniform all over the earth for discussion purposes). A pendulum (whether simple or complex) exhibits such a strong tendency to vibrate at its natural frequency that this property has been named isochronism. It is this tendency which allows the use of a pendulum in regulating clocks and for very accurately determining the value of gravitational acceleration.

If the pendulum is freely suspended repeated injection of very little energy at the natural frequency of the pendulum is required to produce large amplitude oscillations. Thus the sensitivity of the pendulum to motions at its point of suspension is very great. This is equivalent to "amplification" of the motion of the suspension point at a particular frequency by virtue of the storage of energy in the pendulum, since the losses are so low. For example, in a pendulum regulated clock only a small amount of energy need be supplied to keep the pendulum oscillating and the pendulum will continue to oscillate for some time after the energy source is removed.

While a freely moving pendulum satisfies design criteria (a), (c) and (d) above, the high sensitivity of the pendulum to frequencies near its natural frequency renders the pendulum unsuitable for a horizontal ground motion detector without modification since it does not respond sufficiently over a wide enough range of frequencies. In order to obtain a wider range of response it is necessary to increase the losses in the resonant system by applying some damping to the pendulum.

The application of viscous damping to the pendulum's motion causes the resonant peak response to be much reduced and the range of frequencies over which the sensor has substantially constant response to be increased. However, since the damping involves increasing the lossiness of the resonant system it also reduces its overall sensitivity. This is compensated for by reducing the amount of movement of the pendulum bob required to trigger the device, thus effectively increasing the "gain" of the system. However, this also increases the sensitivity of the sensor to being out of level. Several alternative solutions to the leveling problems will be described below.

It has been found that the response of a pendulum with a damping factor of 0.25 provides optimum frequency response to discriminate between those vibrational frequencies within the critical range and those outside it. The sensor is designed so that its natural frequency is centered at two vibrations per second giving its equal sensitivities at 0.5 and eight vibrations per second which is practically ideal for sensing earthquake vibrations as discussed above. Further, with this damping coefficient the response falls off uniformly at frequencies above and below resonance with a scaling factor of 1 — i.e., at half the frequency the relative response is 50%. This shows the sensor to be a velocity sensor below its resonant frequency and an integral-of-displacement sensor above its resonant frequency. The effect of this is to make the system practically completely insensitive to vibrations above 8 vibrations per second which greatly improves the rejection of man-made vibrations as discussed above. In simple terms, what occurs is that the direction of motion reverses before the pendulum has moved sufficiently far to trigger the device unless the vibration is extremely large.

Referring now to FIG. 1, the particular construction of a preferred embodiment of a horizontal ground motion sensor employing a pendulum with viscous damping will now be described. FIG. 1 depicts a compound pendulum 12 mounted within a sealed case 14. The interior of case 14 forms a chamber 16 which contains, in addition to pendulum 12, a quantity of fluid 18 of suitable viscosity as determined below.

Pendulum 12 is mounted within chamber 16 for omnidirectional pivotal movement in a horizontal plane. To this end pendulum 12 is supported by ball pivot 20 at the top of vertical support shaft 22 which extends downwardly within a central vertical bore 24 in pendulum 12 and through case 14.

The portion of shaft 22 extending through case 14 is threaded as indicated at 26 to receive a mating thread in case 14 which is used to adjust the vertical elevation of ball pivot 20 within chamber 16 and is locked in place by nut 28. It will be seen that this elevation determines the thickness of the gap $y$ between the bottom surface of pendulum 12 and the bottom surface of chamber 16.

Pendulum 12 includes an upper neck portion 30 having a cylindrical exterior surface and a lower base portion 32 also of cylindrical shape. This shape lowers the center of gravity of the pendulum to obtain the lowest resonant frequency for a given pendulum length. Therefore, for purposes of the design analysis presented below, it will be assumed that substantially all of the pendulum's mass is located in the base portion 32. Bearing plate 34 forms a closure for the upper opening of bore 24 and is maintained in position between neck 30 and cover plate 36 by means of suitable fastening means such as screws 38. Bearing plate 34 thus forms the pendulum support surface resting on ball pivot 20 at point 20a and is made of hardened steel to minimize the friction between the plate and the ball pivot.

The bottom surface 42 of the pendulum is formed with a semi-spherical contour and confronts a conforming surface 44 of case 14 which forms the bottom of chamber 16. As discussed above the thickness of the fluid gap $y$ between surface 42 and 44 is determined by the vertical elevation of shaft 22 as controlled by adjusting shaft 22. Nut 28 serves to lock the shaft 22 in the desired position.

It will thus be seen that pendulum 12 takes the form of a hollow bell mounted for pivotal movement in the horizontal plane. The motion of the bell in response to applied lateral forces is opposed by a viscous friction force which depends on three factors:

a. the area of the bottom surface (42) of the pendulum upon which the viscous friction force acts;
b. the thickness of gap $y$; and
c. the viscosity of fluid 18.

As will be discussed below the pendulum is tuned to exhibit the desired frequency response by the proper control of these factors. For example, assuming specific pendulum dimensions and material and a particular damping fluid, it is possible to calculate the thickness of gap $y$ which will provide a response to anticipated lateral accelerations above a threshold value and within the critical frequency range.

In operation, when the pendulum is subjected to lateral vibrational forces within the critical range of frequencies the pendulum will pivot about point 20a. If the applied force is sufficiently strong the pendulum will pivot far enough for needle 60 which rides on cam surface 36a of cover plate 36 to descend separating electrical contact 62 attached to the top of needle 60 from stationary electrical contact 64 as depicted in FIG. 2. This will interrupt power to suitable electronic control circuitry which may be positioned at a remote location from the sensor itself. The particular electrical system is designed to make or break contacts or provide a suitable signal to control circuitry.

A simplified set of design calculations are presented below to illustrate the technique by which the control parameters necessary for the desired frequency response are determined.

DESIGN VARIABLES

A. Resonant Center Frequency $(f_n)$ (selected from seismic response data)

$f_n = 2$ vibrations/sec $= 2$Hz

∴ distance to center of gravity (c.g.) is approx.

$(d) = g/(2\pi f_n)2 = 2.45$ inches

B. Pendulum Dimensions cylinder height $(h) = 3$ in.
outside diameter $(d_o) = 3$ in.
inside diameter $(d_i) = 1$ in.
active surface area $(A) = \pi/4(d_o^2 - d_i^2) = 6.28$ in$^2$ (0.0436 ft$^2$)
volume $(V) = Ah = 18.8$ in$^3$ C. Pendulum Weight (W)

$W = \rho V$ (assume rolled steel: $\rho = 0.283$ lb/in$^3$)
$W = (0.283$ lb/in$^3)(18.8$ in$^3) = 5.33$ lb D. Lateral Triggering Acceleration $(a_{max})$ (chosen from seismic response data)

$a_{max} = 0.15g = 4.83$ ft/sec$^2$

E. Damping Factor ($k$)

(derived from seismic response data)

$k = 0.25$

F. Damping Fluid Viscosity ($\mu$)

assume Dow Corning Series 200 silicone fluid $\mu = 0.400$ poise $= 0.0269$ lb-sec/ft$^2$

RESULTING HARMONIC MOTION

G. Lateral Triggering Force ($F_t$)

$F_t = ma_{max} = (W/g)a_{max} = (W/g)(0.15g) = 0.15W$ $F_t = 0.8$ lb

H. Viscous Friction Force ($F_v$)

$F_v = kF_t = (0.25)(0.8 \text{ lb}) = 0.2$ lb

I. Viscous Force per Unit Area ($\tau$)

$\tau = \dfrac{F_v}{A} = \dfrac{0.2 \text{ lb}}{0.0436 \text{ ft}^2} = 4.59$ lb/ft$^2$

J. Maximum Lateral Velocity ($V_{max}$)

$a = a_{max}\sin \omega t = a_{max}\sin(2\pi f_n t)$ $V = \int a \, dt = (a_{max}\sin \omega t)/\omega$ $V_{max} = \dfrac{a_{max}}{\omega} = \dfrac{a_{max}}{2\pi f_n} = \dfrac{4.83 \text{ ft/sec}^2}{12.56 \text{ rad/sec}}$ $V_{max} = 0.384$ ft/sec

K. Maximum Lateral Deflection ($\Delta$)

$\Delta = \int V \, dt = \dfrac{a_{max}}{\omega^2} = \dfrac{a_{max}}{(2\pi f_n)^2} = \dfrac{4.83 \text{ ft/sec}^2}{157.7 \text{ rad}^2/\text{sec}^2}$ $\Delta = 0.0305$ ft $= 0.366$ in

L. Required Fluid Velocity Gradient Across Gap ($dV/dy$)

$\dfrac{dV}{dy} = \dfrac{\tau}{\mu} = \dfrac{4.59 \text{ lb/ft}^2}{0.0269 \text{ lb-sec/ft}^2} = 170$ ft/sec/ft

GAP THICKNESS

M. Gap Thickness ($y$)

$\tau = \mu \dfrac{dV}{dy}$ $y = \dfrac{\mu V_{max}}{\tau} = \dfrac{0.383 \text{ ft/sec}}{170 \text{ ft/sec/ft}}$ $y = 0.0023$ ft $= 0.027$ in It will be apparent that instead of selecting a particular damping fluid and calculating a gap thickness from the fluid viscosity the design procedure could be reversed. That is, a specific clearance could be assumed (e.g., 0.010 inches) and a required viscosity determined. A fluid possessing the determined viscosity would then be selected. This approach will be used in the design example for the vertical sensor presented below.

It will also be apparent that various natural resonant frequencies and degrees of damping may be applied to give a wide range of response characteristics. Selection of the proper parameters for optimum performance requires consideration of the characteristics of expected ground motions and structural responses to these applied forces. Among the many advantages of the embodiments described herein is that due to their physical compactness testing of the sensors on vibration fixtures and shake tables capable of duplicating actual motion experienced allows verification of the design parameters to a much higher degree than can be obtained with more cumbersome devices.

As mentioned above, horizontal ground motion sensors have to be very carefully leveled since the acceleration force due to gravity will cause the sensor to respond. Any device which integrates forces to obtain velocities and displacements is particularly sensitive to being out of level, since the time integral of a constant acceleration is an infinite velocity or displacement.

The resonant sensor described above does not integrate constant acceleration, but it must be leveled nonetheless to produce equal sensitivity in all horizontal directions. This presents an installation problem and several solutions will be described.

One approach is to form the sealed case containing the resonant pendulum with sufficiently precise exterior reference surfaces to ensure that the neutral position of the pendulum will be vertical. It would then be possible to mount the case in position with the correct degree of leveling by means of a carpenter's bubble, level, square, etc. This method is inconvenient, however, if the mounting surface is not level or square to level since shims or adjustable mounting brackets are required. An automatic or semi-automatic leveling scheme is desirable to greatly reduce the effort required to install the sensor as well as to insure that the installation is correct.

One such automatic leveling scheme involves providing the sensor case with a properly positioned suspension point on which the whole sensor can be hung. In this situation the force due to gravity will level the device. Of course this freely suspended case forms another resonant pendulum so that some means must be used to restrain the motions of the case once it has assumed its level attitude.

One way to accomplish this is to provide a second case enclosing the sensor case with a space comprising a second chamber between the cases. This second case is partially filled with a highly viscous fluid or grease. The highly viscous fluid causes the sensor case to be overdamped so that no amplification of motions at any frequency occurs, and the suspension system is an ideal high-pass filter, passing all frequencies of interest to the inner (sensor) case.

As soon as the sensor is mounted in its fixed outer case in a reasonably level position the gravitational force causes the inner case to begin moving the viscous fluid. After a time the inner case, and therefore the entire sensor system, will assume a level position automatically. Furthermore, this leveling action is continuously automatic with time, so that gradual settling or tilting of the structure on which the sensor is mounted will not cause the system to become incorrectly leveled. In this connection it should be noted that gradual unequal settling of buildings often occurs if the building is situated on fill land or if underground water tables vary. Of course it may be desirable to have the sensor respond to gradual structure settling. In this case the second leveling method described below may be more appropriate.

Another semi-automatic means of obtaining leveling of the sensor also utilizes a fixed second outer case with the sensor case suspended inside ad described above. In this solution, the outer case is partially filled with a metal alloy having a very low melting point, such as Woods' Metal or one of a number of investment casting materials such as Cerro-Bend, etc.

To install the sensor the outer case is fixed to the mounting position in a reasonably correct orientation. The alloy is then heated in any convenient manner, such as by applying heat to the outside case until the alloy liquefies. When this occurs the inner case will be free to move on its suspending eye and will assume a true level attitude. The alloy is then allowed to cool and resolidify. This will cause the inner case and sensor to be fixed in the correct position. Proper choice of the alloy and sensor materials will prevent remelting of the alloy by environmental temperatures. Thus, the sensor will be rigidly fixed in relationship to its mount and the sensor will respond to gradual tilting of the mounting.

If it is ever desired to re-level the sensor it is only necessary to reheat the alloy to its liquid state and readjustment will occur. The outer case can consist of an open frame with only the lower portion forming a cup to contain the alloy when liquid. An open frame construction will allow the alloy to be heated externally and put into the cup where it would harden in the above described manner. This would add some speed and convenience to the installation procedure.

In FIG. 4 is depictd a combination of the above ideas. The sensor is contained in housing 100, which is suspended from pivot 102 by means of connecting rods 104 and cross bar 106. Cross bar 106 has indent 108 which rests on the pivot 102, and is shaped so that the assembly freely moves under gravitational forces to a level position. Extending from the bottom of container 100 by means of supporting rod 110 is plate 112. Cup 114 contains a very viscous fluid or semi-fluid 116 in which plate 112 is immersed. Both cup 114 and pivot 102 are rigidly mounted to the wall or other vertical structure by means not shown. The depicted device provides for automatic leveling without interfering with the operation of the sensor.

C. Vertical Ground Motion Detector

FIG. 3 illustrates one embodiment of a ground motion detector which is primarily sensitive to vibrational forces in the vertical plane. As in the case of the horizontal ground motion detector described above, the underlying design principle is that of viscously damped harmonic motion. Also as in the case of the horizontal sensor, by proper selection of the design parameters the sensor may be tuned to respond to a particular resonant center frequency and exhibit a desired bandwidth.

Referring now to FIG. 3, a dashpot cylinder 70 is enclosed within a stationary chamber 72 formed by case 74. The case is provided with a central aperture 76 in its upper surface through which passes a vertically extending connecting rod 78 centrally positioned by bearing 79. The rod 78 is attached to the upper wall of cylinder 70 and extends into wall 81, where it is movably held by bearing 83. The rod is therefore capable of vertical movement. The upper portion of rod 78 terminates in an eye 78a.

The lower end of vertically disposed spring 80 passes through eye 78a while the upper end of the spring is attached to a stationary mounting surface 82. Eye 78a is formed with two horizontally extending discs 78b and 78c. When cylinder 70 is excited by sufficiently large vertical ground movements within the critical range of frequencies, cylinder 70 will move a sufficient vertical distance $d$ to complete a circuit between spring contacts 82 and 84 thereby actuating appropriate external control circuitry.

Cylinder 70 is provided with a central vertically extending bore 70a and a plurality of peripheral bores 70b arranged in a circular pattern around the cylinder's vertical axis for escape of air to avoid damping upon movement. Case 74 contains a quantity of viscous fluid 86 and a small fluid gap or clearance $x$ is formed between the exterior vertical cylindrical surface 88 of cylinder 70 and the confronting conformingly-shaped cylindrical interior surface 90 of case 74. This gap corresponds to gap $y$ in the embodiment of FIGS. 1 and 2 and similarly serves to generate the viscous force which opposes the motion of the moving element.

The cylinder 70 is designed so as to minimize any viscous forces of the fluid affecting the movement of the cylinder except for the forces in the gap indicated by $x$.

Given particular cylinder dimensions and weight and the desired resonant center frequency and damping factor the dynamic response of the cylinder to applied vertical forces can be determined by using the same basic harmonic motion equations as in the previous design example. Further, by assuming a given clearance $x$ the required fluid viscosity can be calculated and the proper fluid selected. The following is a simplified example of such a design approach.

ASSUMED DESIGN PARAMETERS

A. Piston Dimensions diameter (D) = 3.5 in.
active height (H) = 0.5 in.
active surface area (A) = $\pi DH$ = 0.0382 ft$^2$ B. Piston Weight (W)

W = 3.5 lb

C. Resonant Center Frequency ($f_n$) from measured seismic data $f_n = \sqrt{10}$ Hz = 3.16 Hz D. Damping Factor ($k$) selected for optimum bandwidth $k = 0.25$ E. Vertical Triggering Acceleration ($a_{max}$) from safety code requirements $a_{max} = 0.15$ g = 4.83 ft/sec$^2$ f. Gap Thickness ($x$) (convenient to manufacture)

$x = 0.010$ in.

HARMONIC MOTION

G. Maximum cylinder Velocity ($V_{max}$)

$a = a_{max} \sin \omega w$ $V = \int a\,dt = \dfrac{a_{max} \sin \omega t}{\omega}$ $V_{max} = \dfrac{a_{max}}{\omega} = \dfrac{a_{max}}{2\pi f_n} = \dfrac{4.83 \text{ ft/sec}^2}{2\pi(\sqrt{10})\text{rad/sec}}$ $V_{max} = 0.2429$ ft/sec

H. Maximum cylinder Displacement ($d$)

$d = \int v\,dt = \dfrac{a_{max}}{\omega^2} = \dfrac{a_{max}}{(2\pi f_n)^2} = \dfrac{4.83 \text{ ft/sec}^2}{40\pi^2 \text{rad}^2/\text{sec}^2}$ $d = 0.0122$ ft $= 0.1467$ in

I. Spring Constant ($K$)

$\omega_n = 2\pi f_n = \sqrt{K/M}$ $K = M(2\pi f_n)^2 = W/g(40\pi^2)$ $K = (\dfrac{3.5 \text{ lb}}{32.2 \text{ ft/sec}^2})(40\pi^2 \text{rad}^2/\text{sec}^2)$ $K = 43$ lb/ft

J. Damping Coefficient ($c$)

$k = \dfrac{c}{2\sqrt{KM}}$ $c = 2k\sqrt{K\left(\dfrac{W}{g}\right)}$ $c = 0.5 \sqrt{\dfrac{(42.9 \text{ lb/ft})(3.5 \text{ lb})}{32.2 \text{ ft/sec}^2}}$ $c = 1.08$ lb/ft/sec

K. Viscous Damping Force ($F_v$)

$F_v = c\,V_{max}$ $F_v = (1.08 \text{ lb/ft/sec})(0.2429 \text{ ft/sec})$ $F_v = 0.2625$ lb

L. Viscous Force Per Unit Surface Area ($\tau$)

$\tau = \dfrac{F_v}{A} = \dfrac{0.2626 \text{ lb}}{0.0383 \text{ ft}^2}$ $\tau = 6.85$ lb/ft$^2$

DAMPING FLUID

M. Fluid Viscosity ($N$)

$\tau = \mu\left(\dfrac{dV}{dx}\right) = \mu\left(\dfrac{V_{max}}{x}\right)$ $\mu = \dfrac{\tau x}{V_{max}} = \dfrac{(6.88 \text{ lb/ft}^2)(0.010 \text{ in})}{(0.2429 \text{ ft/sec})(12 \text{ in/ft})}$ $\mu = 4.21$ poise $= 421$ centipoise e.g. castor oil While two embodiments of the mechanically resonant tuned ground motion detector of the present invention have been shown and described above it will be apparent to those skilled in the art that various modifications of the disclosed apparatus may be made without departing from the spirit and scope of the present invention as defined by the following claims. For example, although the above discussion focused upon the problems of detecting earthquake motion and discriminating against other motions, it will be apparent that the principles used are quite general and may be applied to other purposes such as explosion detection with suitable changes in the design parameters.

I claim:

1. A tuned resonant ground motion sensor comprising:
    a. housing means;
    b. oscillatory mass means mounted in said housing for harmonic movement from a neutral position to a signaling position in response to applied vibrational forces falling within a predetermined frequency range; and
    c. viscous damping means contained in said housing for impeding the natural harmonic motion of said mass means to broaden the range of frequencies to which said mass means responds, said viscous damping means comprising a viscous fluid in which said mass means is partially immersed, and wherein at least a portion of said mass means confronts a conforming surface of said housing across a narrow gap, said gap being completely occupied by said fluid.

2. The sensor of claim 1 further comprising trip means operatively associated with said mass means and responsive to the motion thereof for signaling an external electronic control circuit when said mass means is moved to said signaling position.

3. The sensor of claim 2 wherein said mass means further comprises a pendulum mounted for pivotal omni-directional movement in a horizontal plane, the bottom surface of said pendulum having a semi-spherical contour, and wherein said fluid gap is formed between said semi-spherical surface and a conforming confronting surface of said case.

4. The sensor of claim 2 wherein said mass means further comprises a cylinder, spring-mounted for vertical oscillatory movement and having a cylindrical exterior side surface, and wherein said fluid gap is formed between a portion of said cylindrical surface and a confronting conforming surface of said case.

5. The sensor of claim 3 wherein said pendulum is suspended from a ball pivot and wherein the vertical elevation of said ball pivot with respect to said case may be adjustably varied to control the size of said fluid gap.

6. The sensor of claim 5 wherein said trip means further comprise:
   a cam projection extending vertically upward from said pendulum above said ball pivot;
   a vertical needle, the lower end of which terminates in a point which rides on said cam projection, said needle being mounted for vertical movement from an upper position to a lower position in response to the rotational movement of said cam surface;
   a first electrical contact attached to the upper end of said needle; and
   a second electrical contact attached to said housing in operational relationship to aid first contact for producing a signal upon movement of said pendulum to said signaling position.

7. The sensor of claim 4 further comprising:
   a rod attached to the top of said piston and extending vertically upward therefrom, the upper portion of said rod terminating in an eye; and
   a coil spring attached to said eye and extending vertically upward therefrom, the top of said spring being attached to a mounting surface of said housing.

8. The sensor of claim 7 wherein said trip means further comprise:
   a pair of horizontal discs extending from opposite sides of said eye; and
   a pair of spring contacts each spaced in relationship to an associated one of said discs, to signal said external control circuit upon movement of said means to said signaling position.

9. The sensor of claim 3 further comprising fluid leveling means in operational relationship with said housing.

10. The sensor of claim 9 further comprising:
    a pivot having attachment means for rigid attachment to a surface;
    a supporting bar pivotably mounted on said pivot with said housing symmetrically suspended from said bar; and
    a container having attachment means for rigid attachment to said surface containing a viscous fluid or low melting solid in which said housing is partially immersed to allow leveling of said housing without impeding reception of said vibrational forces by said sensor.

* * * * *